United States Patent
Kawaguchi et al.

(10) Patent No.: US 6,524,136 B2
(45) Date of Patent: Feb. 25, 2003

(54) ELECTRICAL CONNECTION BOX INCLUDING REMOVABLE COVER ENCLOSED WITHIN A CASING

(75) Inventors: Kiyofumi Kawaguchi, Yokkaichi (JP); Nobuhiro Takada, Toyota (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/973,759

(22) Filed: Oct. 11, 2001

(65) Prior Publication Data

US 2002/0043876 A1 Apr. 18, 2002

(30) Foreign Application Priority Data

Oct. 16, 2000 (JP) .......................................... 2000-314975

(51) Int. Cl.[7] .......................... H01R 13/68; H01R 33/95
(52) U.S. Cl. ...................... 439/621; 439/76.2; 439/949
(58) Field of Search ................................ 439/76.2, 949, 439/892, 718, 621

(56) References Cited

U.S. PATENT DOCUMENTS

| | | | | |
|---|---|---|---|---|
| 5,150,094 A | * | 9/1992 | Babini | 439/621 |
| 5,531,345 A | * | 7/1996 | Nakamura et al. | 220/3.8 |
| 5,788,529 A | * | 8/1998 | Borzi et al. | 439/76.2 |
| 6,004,159 A | * | 12/1999 | Liang | 439/621 |
| 6,224,426 B1 | * | 5/2001 | Kaneko | 439/621 |

* cited by examiner

Primary Examiner—Tulsidas Patel
Assistant Examiner—Hae Moon Hyeon
(74) Attorney, Agent, or Firm—Oliff & Berridge, PLC

(57) ABSTRACT

An electrical connection box for a vehicle has a body and a power distribution element. A portion of the body upstanding from one face receives, in use, an electrical component such as a relay which at a fastening location is joined to the distribution element. A casing covers the component receiving portion. To reduce the risk of accidental contact with the fastening location, the box has a removable U-shaped cover covering the fastening location, the cover being enclosed within the casing. The cover has an aperture through which the electrical component projects, and the periphery of the aperture may contact the component receiving portion or the electrical component.

18 Claims, 5 Drawing Sheets

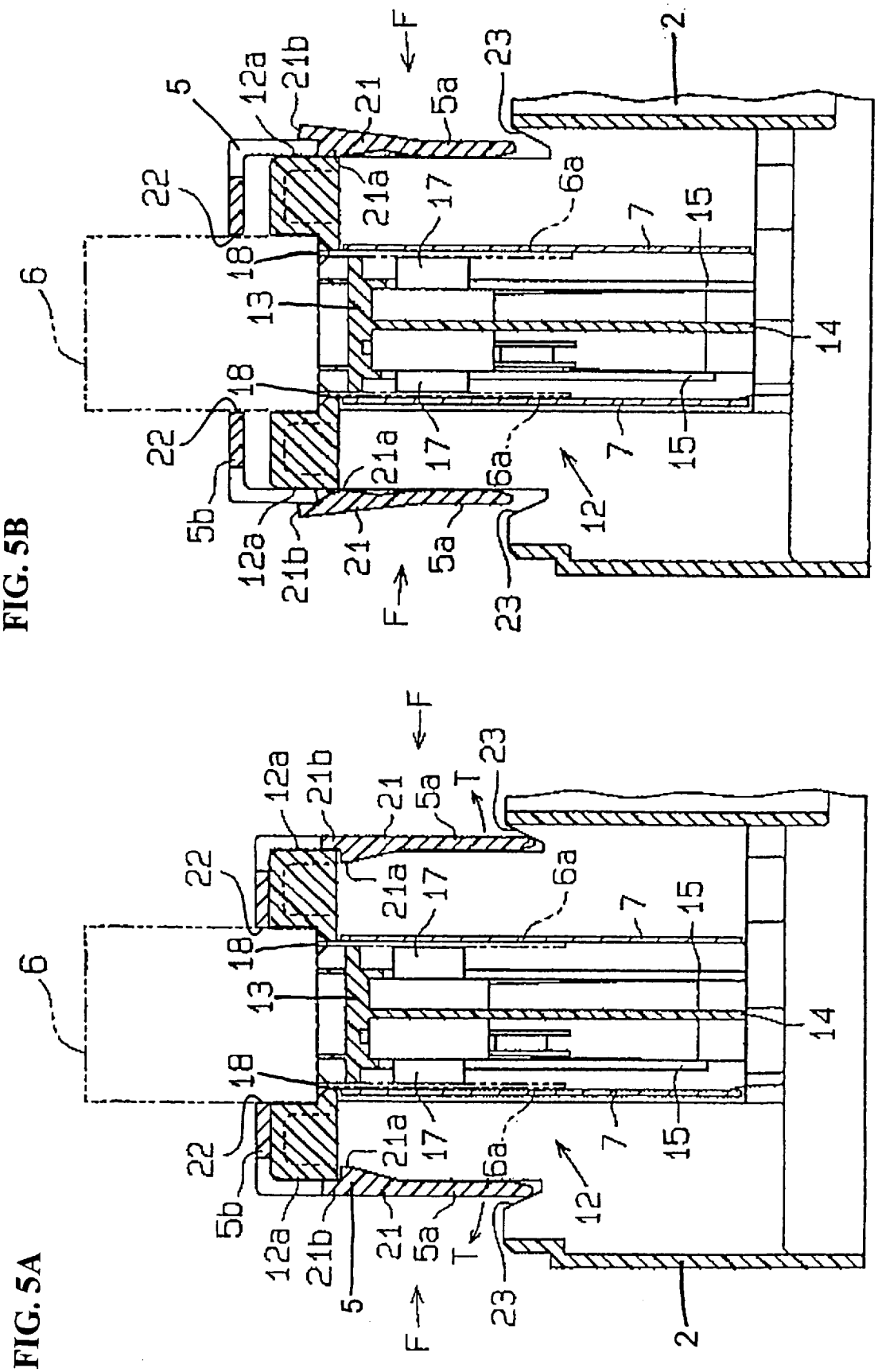

ELECTRICAL CONNECTION BOX INCLUDING REMOVABLE COVER ENCLOSED WITHIN A CASING

BACKGROUND OF THE INVENTION

1. Field of Invention

The present invention relates to an electrical connection box suitable to be installed on a vehicle, for example an automobile. More particularly, the invention relates to an electrical connection box accommodating an electrical component part, which is fastened to a power distribution element such as a bus bar or an electric wire of the connection box. The invention also relates to a vehicle having such an electrical connection box installed on it.

2. Description of Related Art

Electrical component parts in a vehicle are mounted on a vehicle body, accommodated in an electrical connection box. It is necessary to apply high current to some electrical component parts connected to a battery, an alternator, or the like. It is also necessary to fasten connection terminals of bus bars, electric wires and the like distribution elements to connection terminals of the electrical component parts by bolts or the like.

FIG. 4 shows an example of a conventional electrical connection box 51 accommodating electrical component parts requiring to be fastened to distribution elements. The box 51 has a block body 52, which may be a one-piece molding, an upper case 53 and a lower case 54.

A plurality of component receiving portions 55 are arranged on the upper face 52a of the block body 52. At fastening locations 57 connection terminals 56a of a fusible link 56 of bolt-fastening type are fastened to bus bars 58 by bolts or the like. The fastening locations are on a body portion projecting up from the face 52a which has a socket 55a for receiving fusible links 56. At the fastening locations 57 the insertion direction of a bolt or the like is shown by an arrow F in FIG. 4. Thus, the fastening portion 57 is open laterally with respect to the face 52a to enable the fastening to take place using a bolt or the like.

The upper case 53 is installed on the block body 52 to cover the component part-installing surface 52a. The lower case 54 is installed on the lower face of the block body 52.

However, in this known electrical connection box 51, because the fastening location 57 extends toward the face 52a, the bus bar 58 and the bolt fastened at the fastening location 57 are exposed to the exterior. Consequently, tools or other objects may contact the fastening location 57 during maintenance, which may cause shorting.

SUMMARY OF THE INVENTION

Accordingly, it is an object of the present invention to provide an electrical connection box that can reduce risk of accidental contact of objects with a fastening location at which an electrical component part and a distribution element such as a bus bar are connected.

According to the invention there is provided an electrical connection box including:
  a body having a face, the body carrying an electrically conductive power distribution element;
  a component receiving portion upstanding from the face of the body for receiving, in use, an electrical component and having a fastening location at which, in use, a connection terminal of the electrical component is fastened to the distribution element;
  a casing covering the face and the component receiving portion; and
  a removable cover covering the fastening location, the removable cover being enclosed within the casing.

In the invention, the fastening location is covered by the cover. Thus, when the casing is removed from the body, the fastening location is not exposed. Accordingly, it is possible to reliably reduce the risk of tools or the like contacting the fastening location during maintenance.

Preferably, the cover has an aperture through which the electrical component projects when installed. The periphery of the aperture may contact the installed electrical component or the component receiving portion.

By this arrangement, the cover can be easily placed in position on the component receiving portion. Further, it is possible to reduce the risk of the installed cover slipping off from the component receiving portion.

Thus the cover is guided by the contact of the periphery of the aperture with the component or the component receiving portion and can be placed in position easily and securely. The cover can be installed easily on the component receiving portion. Moreover, it is possible to reduce the risk of the installed cover being shaken or slipping off from the component receiving portion.

Preferably the cover is located by a recess of the body. It may be locked releasably to the component receiving portion by snap-lock elements.

BRIEF DESCRIPTION OF THE DRAWINGS

Embodiments of the invention will now be described by way of example with reference to the accompanying drawings, in which:

FIGS. 5A and 5B are enlarged sectional views similar to FIGS. 2A and 2B, showing another embodiment of the present invention.

DETAILED DESCRIPTION OF PREFERRED EMBODIMENTS

Figure 1:
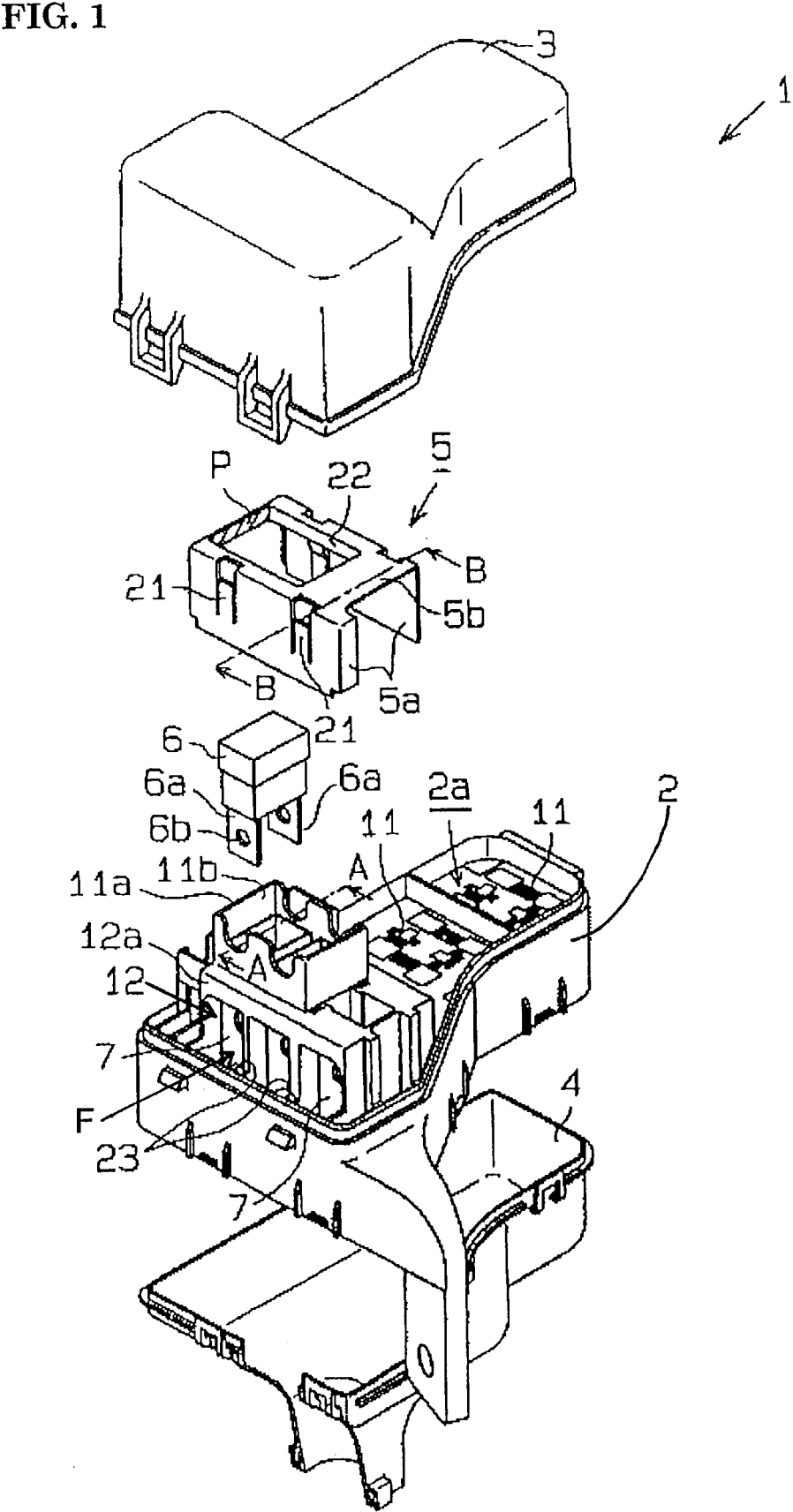
FIG. 1 is an exploded perspective view of an embodiment of the electrical connection box of the present invention.

As shown in FIG. 1, an electrical connection box 1 embodying the invention has a block body 2, an upper case part 3 and a lower case part 4, constituting a casing, and a cover 5 for the fastening locations. Each of these parts may be formed by molding of synthetic plastics material.

Recesses 11 for receiving components, such as a fusible link, a relay, and/or the like, are formed on a surface 2a (in this case the upper face) of the block body 2. Vertically standing bus bars 7 are accommodated in the block body 2. A portion 12 of the body 2, at which a connection terminal 6a of a fusible link 6 of bolt-fastening type is in use fastened to the bus bar 7 by a bolt or the like, projects upwards from the surface 2a. The bus bar 7 is exposed where disposed on the surface 2a.

A recess 11a at which two fusible links 6 are received is formed above the portion 12, surrounded by a wall 11b. Each fusible link 6 has two connection terminal blades 6a each having a hole 6b for a bolt.

Figure 2A:
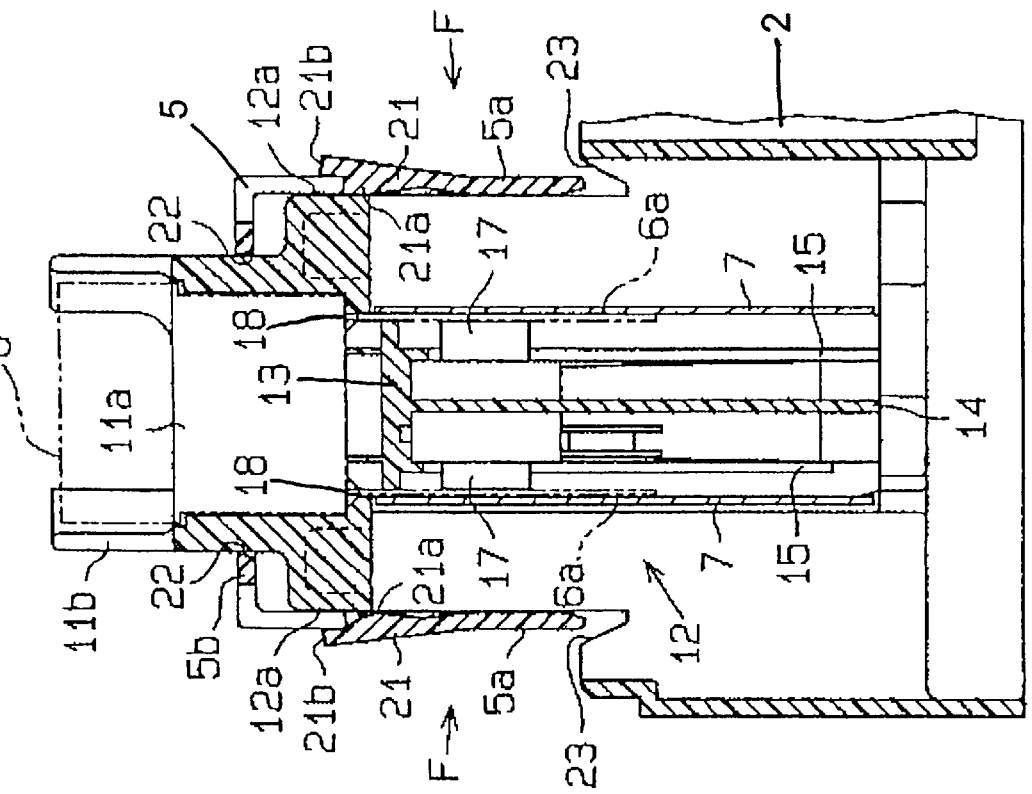
FIGS. 2A and 2B are enlarged sectional views taken along the line A—A of FIG. 1, showing the cover of the fastening locations in two positions.
Figure 2B:
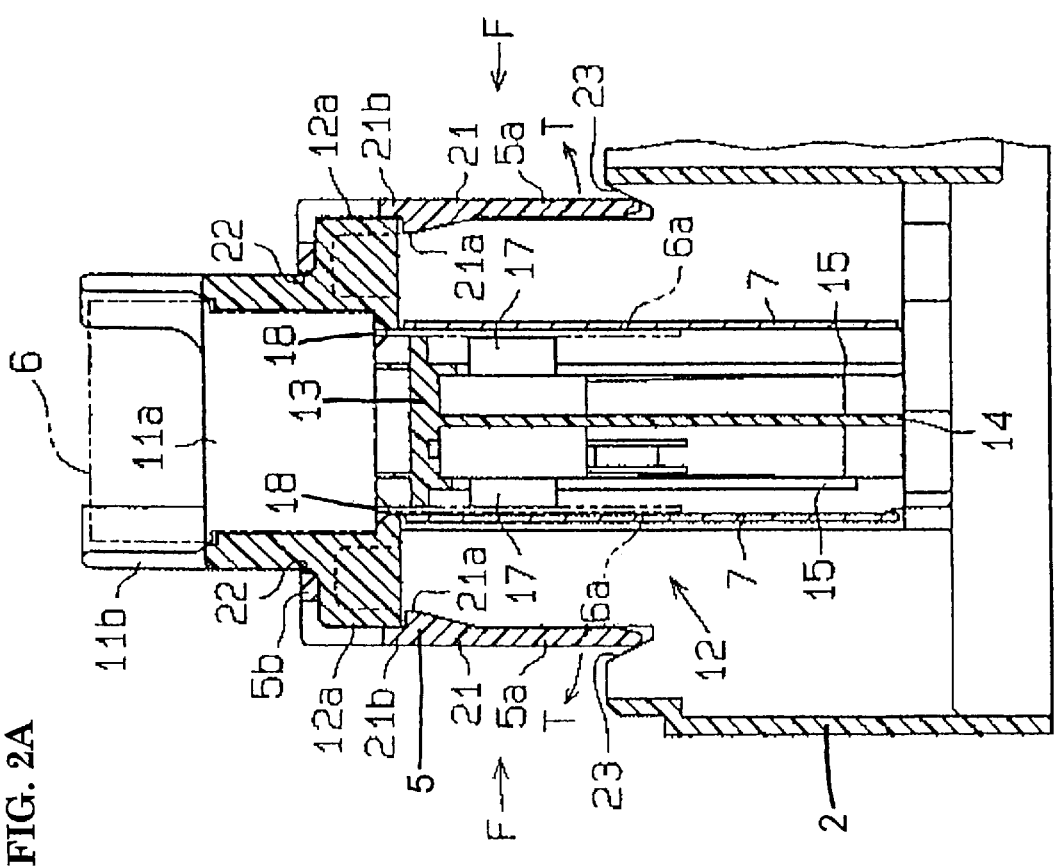

As shown in FIGS. 2A and 2B, the upstanding portion 12 has recesses at which nuts 17 are received in a structure 13 which has a partitioning wall 14 and a pair of nut guides 15. Nuts 17 are inserted into the structure 13, which prevents rotation of each nut 17. Slots 18 communicate with the recess 11a for insertion of the terminal blades 6a of the fusible link adjacent the nuts 17.

As shown by a two-dot chain line in FIGS. 2A and 2B, when the fusible links 6 are installed in the recess 11a, the terminal blades 6a of each fusible link 6 are inserted into the respective slots 18, between the nuts 17 and the bus bars 7. Each terminal blade 6a thus contacts the adjacent nut 17 and the adjacent bus bar 7. Bolts (not shown) are fastened into each respective nut 17 in the directions shown by arrows F in FIGS. 2A and 2B, and tightened to ensure tight connection of the terminal blades 6a and the bus bars 7. Thus the portion 12 stands up from the surface 2a sufficiently to allow the terminal blades 6a and the bus bars 7 to be joined in this manner.

With the block body 2 constructed as described above, the cover 5 is installed on the portion 12. The cover 5 is approximately inverted U-shaped in a sectional view on a line B—B of FIG. 1. The cover 5 has a pair of opposed walls 5a and a top wall 5b connecting the walls 5a to each other. The cover 5 is installed on the portion 12 in the same direction (from above in FIG. 1) as that in which the fusible link 6 is installed in the recess 11a.

Two locking arms 21 are formed on each of the opposed walls 5a, integrally (one-piece) with the respective wall 5a. The outer surface of each arm 21 is formed flush with the outer surface of the wall 5a. The arms 21 are spaced at predetermined intervals and are opposed to each other on the two sides of the cover 5.

As shown in FIGS. 2A and 2B, each arm 21 includes a locking nose 21a projecting toward the opposite wall 5a and a projection 21b projecting upward beyond the locking nose 21a. As shown in FIG. 2B, as the cover 5 is installed on the upstanding portion 12, the locking nose 21a slides in contact with an outer surface 12a of the portion 12 so that the arm 21 flexes outward. As shown in FIG. 2A, when the cover 5 has been fully installed on the portion 12, the arm 21 returns to its original configuration, with the locking nose 21 a engaged under a shoulder of the portion 12. Further, the projection 21b contacts the outer surface 12a of the portion 12. Thus, on each side of the portion 12, the respective bus bar 7 and the bolt (not shown) are covered by the respective wall 5a. The portion 12 is at least partly covered by the cover 5.

Figure 3:
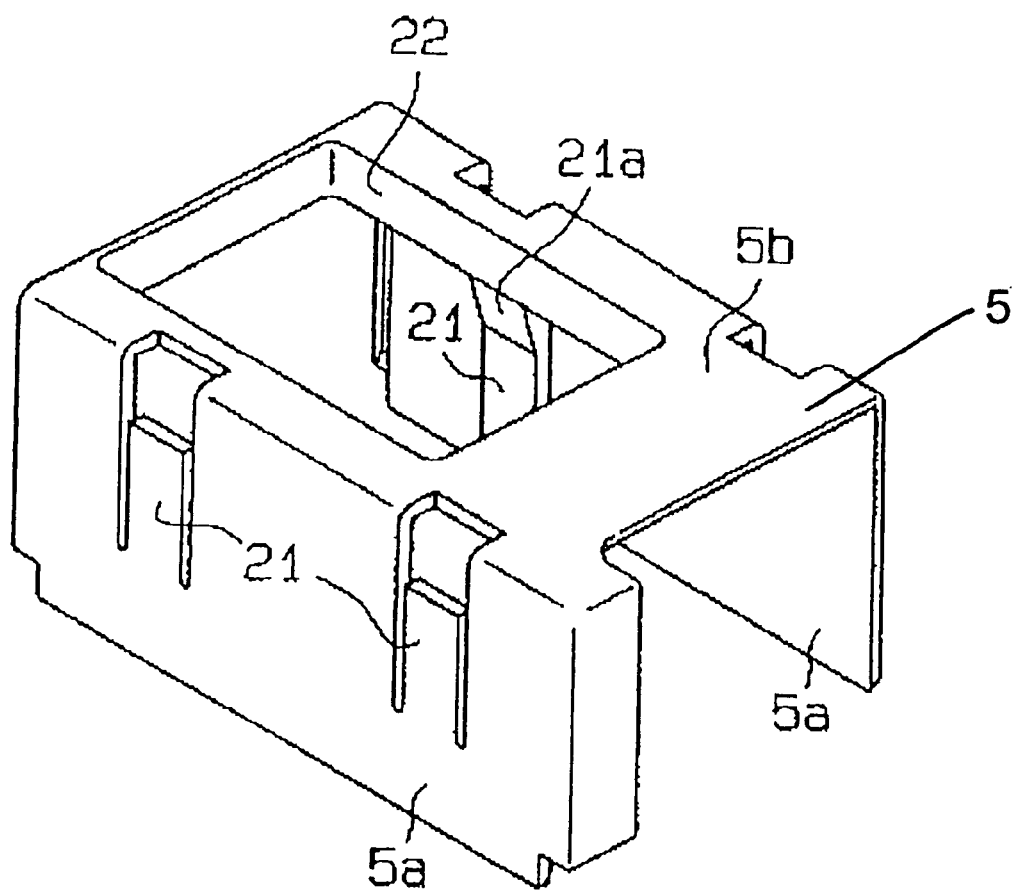
FIG. 3 is a perspective view of the cover for the fastening locations of the box of FIG. 1.
Figure 4:
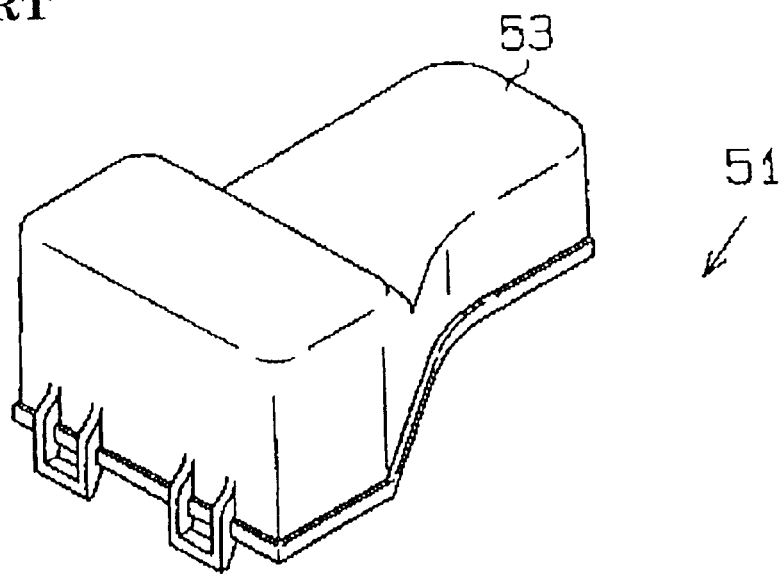
FIG. 4 is an exploded perspective view of a known electrical connection box, described above.
Figure 4:
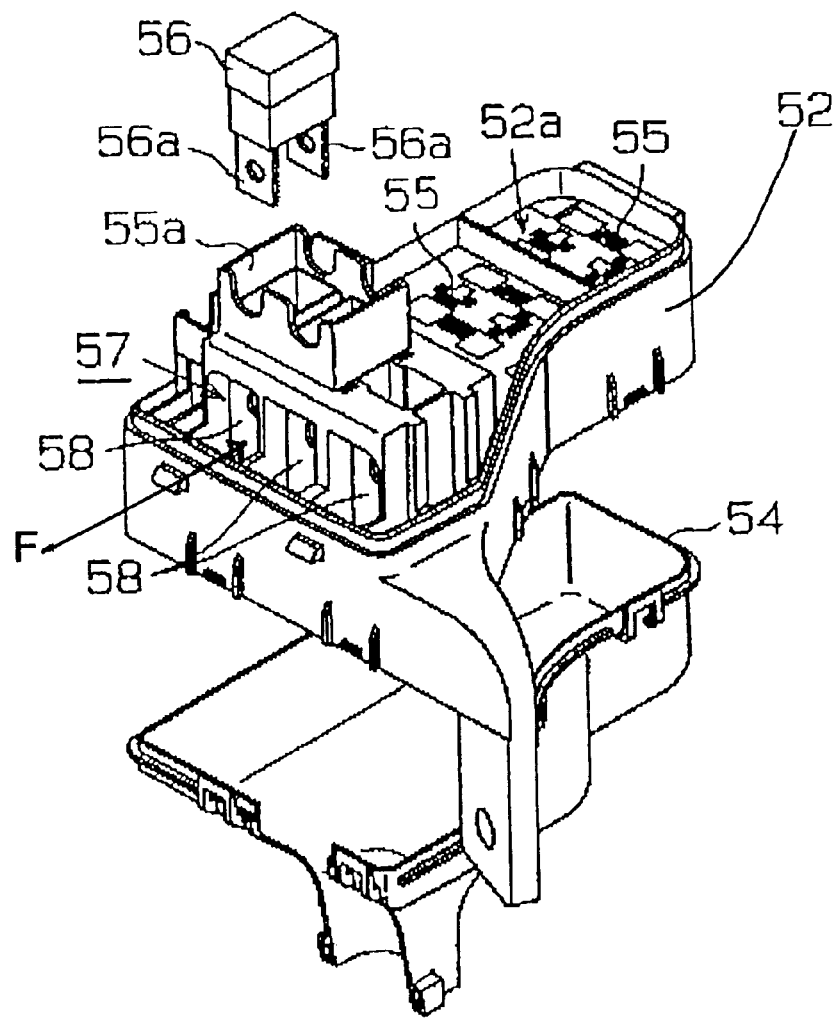

As shown in FIGS. 1 to 3, the top wall 5b of the cover 5 has a rectangular aperture 22 through which the wall 11b is inserted. When the cover 5 is installed on the portion 12, the edge surface around the aperture 22 contacts the outer surface of the wall 11b.

As shown in FIGS. 2A and 2B, guide surfaces 23 are formed adjacent the base of the portion 12 on the block body 2, to form V-shaped notches. When the cover 5 is installed on the portion 12, the lower ends of the walls 5a are accommodated in these notches, which are tapered to guide the lower ends of the walls 5a, and correct any possible outward deformation of the lower portion of the cover 5, as shown with arrows T in FIG. 2A. Further, the guide portion 23 reduces outward deformation of the wall 5a of the cover 5 when fully installed on the upstanding portion 12.

The upper case 3 is installed on the block body 2 in such a way that it covers the surface 2a (see FIG. 1). Thus the cover 5 is accommodated inside the upper case 3. The lower case 4 is installed on the lower surface of the block body 2.

This embodiment provides the following effects:

(1) The upstanding portion 12 at which the components 6 are mounted is covered by the cover 5. Thus when the upper case 3 is removed from the block body 2, the portion 12 is not exposed. Accordingly, it is possible to reliably reduce the risk of tools or the like contacting electrically live parts of the portion 12 during maintenance.

(2) The cover 5 has an aperture 22 through which the wall 11b is inserted. Therefore, the cover 5 can be easily placed in the correct position on the portion 12. This also helps to reduce the risk of the installed cover 5 slipping off the portion 12.

Further, the edges around the aperture 22 contact the outer surface of the wall 11b which has the effect of guiding the cover 5 so that it can be placed in its final position on the portion 12 easily and securely. Moreover, it is possible to reduce the risk of the installed cover 5 being shaken or slipping off the portion 12.

(3) The locking arms 21 of the cover 5 prevent the cover 5 from being removed from the fastening portion 12.

(4) The cover 5 is installed on the portion 12 in the same direction as the fuisible link 6. Therefore, even in the case where an electrical component part such as a relay is installed in the vicinity of the portion 12, the cover 5 can be installed on the portion 12 without the cover 5 interfering with other electrical component parts.

(5) When the cover 5 has been properly installed on the portion 12, the outer surfaces of the locking arms 21 of the cover 5 are flush with the outer surfaces of the walls 5a. If any of the locking arms 21 is not in correct engagement with the portion 12, its outer surface projects from the outer surface of the wall 5a. Thus it is easy to check whether the cover 5 has been completely installed on the portion 12. That is, it is possible to reduce the risk of an incomplete installation of the cover 5 on the portion 12.

(6) The aperture 22 of the cover 5 is a rectangular hole, and the entire edge surface around the aperture 22 contacts the outer surface of the portion 11a. Therefore, it is very easy to place the cover 5 in correct position on the upstanding portion 12. Further it is possible to reliably reduce the risk of the installed cover 5 being dislocated, e.g. by shaking.

(7) The cover 5 is inverted U-shaped in section and sandwiches the portion 12 between its opposed walls 5a. Thus the locking arms 21 and the portion 12 cannot be disengaged easily from each other, which reduces the risk the cover 5 being accidentally removed from the portion 12.

(8) The guide portions 23 are formed on the block body 2. Thus, even if the cover 5 deforms outward, the guide portions 23 correct the deformation. Further the guide portions 23 reduce outward deformation of the walls 5a of the cover 5 installed on the upstanding portion 12.

The above-described embodiment of the present invention described above may be modified in many ways, e.g. as described below.

In the above-described embodiment, bus bars are used as the distribution elements, but electric wires may be used instead as the distribution elements.

The aperture 22 of the cover 5 does not necessarily have to contact the wall 11b. That is, the aperture 22 does not necessarily have to be larger than the contour of the wall 11b.

In the above-described embodiments, the aperture 22 of the cover 5 contacts the outer surface of the portion 11a, but instead the aperture 22 may be so formed that its periphery contacts the outer surface of the fusible link 6, as shown in FIGS. 5A and 5B. In a case where the portion 11a does not have the wall 11b, i.e. the fusible link 6 is installed in an exposed state, it is easy to place the cover 5 in position.

The aperture 22 of the cover 5 is rectangular in the above-described embodiment, but may be circular or the like, provided that it has the same configuration as the outside of the portion 11a. Further, the wall of the aperture 22 may be cut away at a portion P shown with oblique lines in FIG. 1, so that the aperture 22 is open laterally.

The number of the locking arms 21 of the cover 5 is not limited to four, but may be three or less or five or more. The configuration of the locking arm 21 is not limited to a particular one, but any configuration can be adopted, provided that it can lock to the portion 12.

The guide portions 23 may be omitted.

The electrical component part installed in the manner shown is not limited to the fusible link, but it is possible to use other electrical component parts such as a relay having a connection terminal required to be fastened with a bolt.

The cover 5 is installed on the portion 12 in the same direction as the direction in which the fusible link 6 is installed in the recess 11a in the embodiment, but the cover 5 may be installed on the portion 12 laterally. In this case, it is necessary to alter the configuration of the aperture.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An electrical connection box comprising:
    a body having a face and a component receiving portion upstanding from said face and adapted to receive an electrical component having a connection terminal;
    an electrically conductive power distribution element mounted on said body, the connection terminal being fastened to said electrically conductive power distribution element by a fastening element at a fastening location;
    a casing mounted on said body and covering said face of said body and said component receiving portion; and
    a removable cover covering said fastening location and enclosed within said casing.

2. An electrical connection box according to claim 1 wherein said removable cover has an aperture through which said electrical component extends.

3. An electrical connection box according to claim 2 wherein said aperture has a periphery which contacts an outer surface of one of said component receiving portion and said electrical component.

4. An electrical connection box according to claim 1 wherein said removable cover is releasably locked to said component receiving portion by snaplock elements.

5. An electrical connection box according to claim 1 wherein said component receiving portion has at least one guide recess for locating a lower edge of said removable cover.

6. An electrical connection box according to claim 5 wherein the at least one guide recess is inclined to urge the lower edge of the removable cover toward the component receiving portion.

7. An electrical connection box according to claim 1 wherein said fastening element comprises a threaded fastening element.

8. An electrical connection box according to claim 2 wherein said aperture has a periphery which contacts an outer surface of said component receiving portion.

9. A vehicle having:
    an electrical component having a connection terminal; and
    an electrical connection box, the electrical connection box comprising:
        a body having a face and a component receiving portion upstanding from said face and having said electrical component mounted on the component receiving portion;
        an electrically conductive power distribution element mounted on said body, the connection terminal being fastened to said electrically conductive power distribution element by a fastening element at a fastening location; and
        a removable cover covering said fastening location and enclosed within said casing.

10. A vehicle according to claim 9 wherein said removable cover has an aperture through which said electrical component extends.

11. A vehicle according to claim 10 wherein said aperture has a periphery which contacts an outer surface of one of said component receiving portion and said electrical component.

12. A vehicle according to claim 9 wherein said removable cover is releasably locked to said component receiving portion by snap-lock elements.

13. A vehicle according to claim 9 wherein said component receiving portion has at least one guide recess for locating a lower edge of said removable cover.

14. A vehicle according to claim 13 wherein the at least one guide recess is inclined to urge the lower edge of the removable cover toward the component receiving portion.

15. A vehicle according to claim 9 wherein said fastening element comprises a threaded fastening element.

16. A vehicle according to claim 10 wherein said aperture has a periphery which contacts an outer surface of said component receiving portion.

17. An electrical connection box comprising:
    a body having a face and a component receiving portion upstanding from said face and adapted to receive an electrical component having a connection terminal;
    an electrically conductive power distribution element mounted on said body, the connection terminal being fastened to said electrically conductive power distribution element at a fastening location;
    a casing mounted on said body and covering said face of said body and said component receiving portion; and
    a removable cover covering said fastening location and enclosed within said casing,
    wherein said removable cover has an aperture through which said electrical component extends, and wherein said aperture has a periphery which contacts an outer surface of said component receiving portion.

18. A vehicle having:

an electrical component having a connection terminal; and an electrical connection box, the electrical connection box comprising:
- a body having a face and a component receiving portion upstanding from said face and having said electrical component mounted on the component receiving portion;
- an electrically conductive power distribution element mounted on said body, the connection terminal being fastened to said electrically conductive power distribution element at a fastening location; and
- a removable cover covering said fastening location and enclosed within said casing, wherein said removable cover has an aperture through which said electrical component extends, and wherein said aperture has a periphery which contacts an outer surface of said component receiving portion.

* * * * *